July 16, 1968  C. D. GIBSON ET AL  3,392,797
STEERING AND SUSPENSION SYSTEMS FOR MOTORIZED LIFT TRUCKS
Filed Aug. 27, 1964  5 Sheets-Sheet 1

July 16, 1968  C. D. GIBSON ET AL  3,392,797
STEERING AND SUSPENSION SYSTEMS FOR MOTORIZED LIFT TRUCKS
Filed Aug. 27, 1964  5 Sheets-Sheet 4

3,392,797
STEERING AND SUSPENSION SYSTEMS FOR MOTORIZED LIFT TRUCKS
Christian D. Gibson and Robert E. Jones, Greene, N.Y., assignors to The Raymond Corporation, Greene, N.Y., a corporation of New York
Filed Aug. 27, 1964, Ser. No. 392,529
23 Claims. (Cl. 180—52)

ABSTRACT OF THE DISCLOSURE

A lift truck steering system having a pair of steerable wheels, one of which is a powered drive wheel and one of which is a non-castered idler wheel, a pivotable steering beam having a central pivot adapted to be pivoted by a hydraulic cylinder, with drag links connected between ends of the steering beam and the two steerable wheels.

---

The present invention relates to an improved material handling truck, and more particularly, to improved steering and suspension systems for such a vehicle. The invention finds particular utility in industrial truck applications wherein a vehicle capable of extreme maneuverability is required. In many respects the vehicle of the present invention may be regarded as an improvement to the material handling truck shown in U.S. Patent No. 2,564,002 granted Aug. 14, 1951, to Chrisian D. Gibson, and in some respects the present invention represents a departure from the prior invention and the provision of a basic new form of narrow-aisle truck. Trucks built in accordance with the prior invention have enjoyed widespread commercial success due to their compactness and maneuverability, which enable them to be used in much narrower aisles of warehouses and the like, and such trucks have become known commonly as "narrow-aisle" trucks.

Four-wheeled vehicles equipped with automotive-type steering (wherein two dirigible wheels are mechanically interlocked by a tie rod) are inherently incapable of the very sharp turning angles required in a narrow-aisle truck. Three-wheeled vehicles having a single dirigible wheel, lack the lateral stability which is required in many material handling applications. The vehicle shown in the abovementioned patent overcomes both the steering angle limitations of automotive-type steering and the stability limitations of three-wheeled trucks by provision of a four-wheeled truck having two non-steerable front wheels, one steerable powered rear wheel, and an unpowered, self-steering, swivel caster rear wheel. While trucks built in accordance with the prior patent show numerous advantages over their predecessors, they have had certain limitations, as respects wheel size, lateral stability, and required operator platform height, which sometimes have limited their use.

As mentioned above, a cardinal requirement of a narrow-aisle truck is very sharp turning ability. The prior art has provided no completely satisfactory steering systems in which a pair of wheels which must be spaced widely apart for vehicle stability may both be mechanically connected to a single steering control so as to allow extremely sharp turning angles, and the steering system which is most widely used in narrow-aisle trucks is the swivel caster arrangement shown in Patent 2,564,002.

The operation of a swivel caster is stable only when the wheel trails behind the vertical axis of the swivel caster king-pin, and thus it is necessary that a swivel caster pivot through 180 degrees whenever the vehicle reverses its direction by 180 degrees. A force tending to pivot the swivel caster will begin to pivot the caster immediately upon reversal if the truck direction changes somewhat more than 180 degrees. There is no swivelling moment applied to a swivel caster, however, if the vehicle reverses its direction by exactly 180 degrees, and hence it sometimes happens that a swivel caster does not swivel until after the vehicle has attained appreciable velocity in the reversed direction and then turned slightly. Because the caster wheel itself must reverse its direction of rotation as the caster swivels, it will be seen that it must pass through a zero speed condition, and it will be apparent that at the moment such swivelling occurs, having three wheels of the truck rotating and one wheel at zero speed for an instant undesirably may cause the vehicle to lurch, as well as causing undesirable wear on the tires or other wheel surfaces. These limitations have limited the load-carrying capacity of prior narrow-aisle trucks. The present invention overcomes these problems associated with swivel caster wheels by providing a truck which can reverse its direction without a requirement that a caster wheel has to swivel.

In order that a swivel caster steer itself, the vertical axis of the caster king-pin must have a significant "lead" (i.e. must be substantially offset from) with respect to the axis of the caster wheel itself. The king-pin must be installed well inside the perimeter of the truck to insure in a "narrow-aisle" truck that the caster wheel does not extend beyond the truck perimeter when the truck travels in such a direction that its caster wheel side is trailing, but then, when the truck travels in the opposite direction, the caster wheel will swivel in toward the centerline of the truck. Thus insofar as support of the truck is concerned, in the second direction of travel the caster wheel is effectively moved in under the truck through a distance equal to twice the amount of lead or offset of the king-pin axis from the caster wheel. It will be apparent that the caster wheel provides minimum lateral support to the truck when it has pivoted well in under the truck. The present invention overcomes the undesirable effects of such changes in lateral stability associated with the swivel caster wheels of prior narrow-aisle trucks. As well as altering the lateral stability of the truck, it should be apparent that a swivel caster wheel, due to its swivelling requires more space beneath a truck than a fixed wheel of the same diameter would require.

In lieu of the pivoting caster wheel of the prior narrow-aisle trucks, the present invention utilizes a non-castered idler wheel. The truck of the present invention is like that of the prior patent in that it employs a dirigible powered wheel at one rear corner of the truck and a non-powered wheel at the other rear-corner of the truck. In the present invention, however, the unpowered or idler rear wheel is not castered, but arranged with its steering axis perpendicularly intersecting its axle. Because the idler wheel is not castered, it is not, of course, self-steering, and in order to steer the idler wheel a novel steering linkage has been provided. Because compactness is an essential requirement in a narrow-aisle truck, the space available for a steering linkage is inherently very limited, and as pointed out above, very sharp turning angles are required. In the present invention the members of the steering linkage are located in a plane near the base of the truck projecting into a space beneath the battery compartment in the case of a battery-powered truck, or beneath the engine compartment in the case of an engine-driven truck. Although the steering linkage members occupy and swing through an appreciable area, they require very little cubage.

Four-wheeled vehicles having a single driving wheel are extremely limited in tractive ability unless the mating unpowered wheel is designed to yield in some fashion, as by articulation or spring action. If the unpowered wheel is on a higher elevation on the floor than the drive wheel, the unpowered wheel must be arranged to yield vertically to insure adequate contact of the drive wheel with the floor. Spring suspension of at least one of the wheels also considerably improves the riding qualities of the truck, making it much more comfortable for the truck operator. It is highly desirable that the spring force associated with such yielding, and the maximum amount of such yielding be readily adjustable. Furthermore, it is desirable that the relative height or vertical position of the drive wheel and the mating unpowered wheel be capable of ready adjustment to compensate for uneven tire wear or to adjust drive wheel traction. Thus it is a further object of the present invention to provide an improved narrow-aisle truck suspension system in which the height of a vertically yielding unpowered wheel relative to that of a powered drive wheel may be readily adjusted, and further, a truck in which both such adjustments may be made independently of each other.

It is highly desirable in many narrow-aisle trucks to provide power-assist stearing, and desirable that power steering be able to be accomplished by a simple mechanism, such as a single hydraulic piston and cylinder. It has been difficult to provide power-steering to wheels which must be capable of the sharp turning angles required in narrow-aisle trucks. Thus it is a further object of the invention to provide an improved truck steering system of the type described in which power-assist steering may be provided with a single hydraulic piston and cylinder.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

Figure 1:
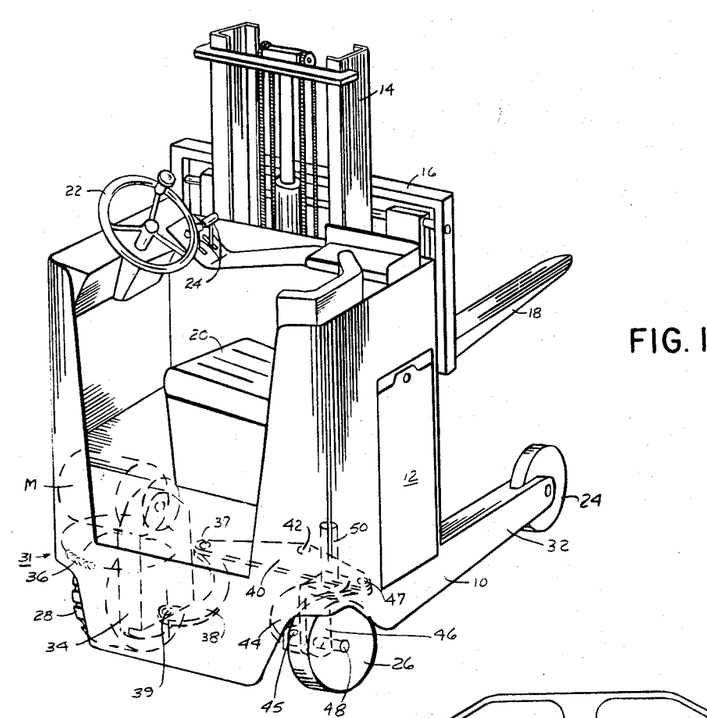
FIG. 1 is a perspective view of one form of material-handling truck constructed in accordance with the invention, with certain portions of the steering and suspension system of the present invention shown in dashed lines.

The truck of FIG. 1 comprises a main frame 10 supported on four wheels, only three of which are visible in FIG. 1. The main frame 10 carries a battery compartment 2 which extends across the truck and in which compartment electric storage batteries to power the truck are situated, a mast 14 up and down which a load carriage 16 is moved, and load-engaging means shown as comprising one fork 18 of a conventional pair of load forks are carried on carriage 16. Also mounted on main frame 10 are a driver's seat 20, a steering wheel 22 and a plurality of further controls 24, 24 which are manipulated by the driver.

While the truck shown in FIG. 1 is provided with seat 20 to accommodate a seated driver, it will become apparent that the invention is applicable as well to trucks having platforms to accommodate standing operators, and in fact, the invention advantageously allows such a platform to be located at a low level, a very short distance above the floor upon which the truck operates.

Figure 9:
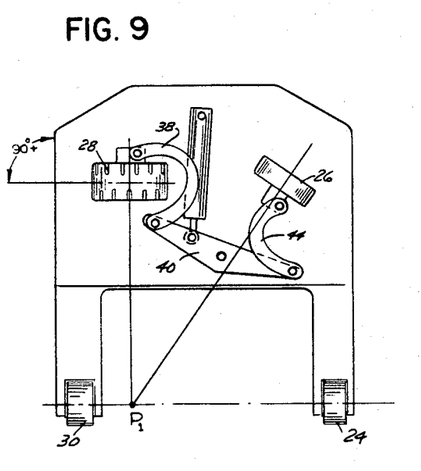
Figure 10:
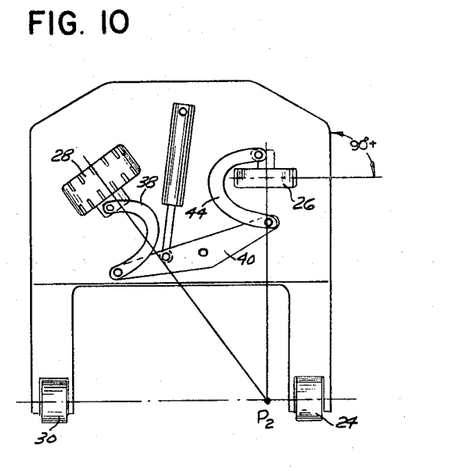

The truck is supported by four wheels 24, 26, 28 and 30, the latter not being visible in FIG. 1. Front wheel 24 is shown journalled at the front end of forwardly-extending arm 32. Front wheel 30 (not shown in FIG. 1) is similarly journalled at the front end of a similar forwardly-extending arm (not shown) which extends parallel to arm 32, as indicated in FIGS. 9 and 10. The truck is driven by dirigible wheel 28, which is driven by motor M through gearing 34 in a manner to be described in detail below in connection with FIG. 3. The drive assembly 31 comprising drive wheel 28, gearing 34 and drive motor M is mounted in bearing means (shown diagrammatically at 36) to rotate about a vertical axis. Drive assembly 31 is pivotally connected at 39 to one end of steering drag-link 38, and the other end of drag-link 38 pivotally connects at 37 to one end of steering rocker beam 40. Rocker beam 40 is pivotally attached at its center 42 by means of bolt or stub shaft 41' to the truck main frame 10, as shown in detail in FIG. 3. The other end of rocker beam 40 is pivotally connected at 47 to one end of a further drag-link 44, and the other end of drag-link 44 is pivotally connected at 45 to wheel member 46. An axle 48 extending from wheel support member 46 carries idler wheel 26. Wheel support member 46 is carried on a vertically extending shaft 50, which is rotatably and slidably mounted in main frame 10, in a manner better seen in FIGS. 3 and 4.

Figure 2:
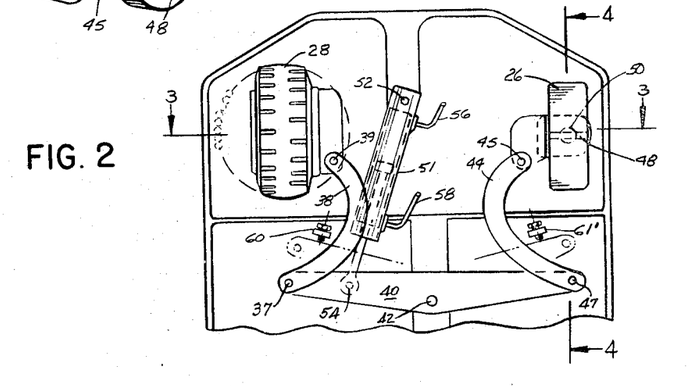
FIG. 2 is a view of a portion of the truck of FIG. 1 looking upwardly from underneath the truck, showing a portion of the steering and suspension system.

As best shown in FIG. 2, a double-acting piston-cylinder assembly 51 is pivotally connected at 52 and 54 to act between the truck main frame 10 and pivoting steering beam 40, and hydraulic pressure connections are made to the piston-cylinder assembly 51 via flexible hoses 56 and 58, which are connected to conventional hydraulic power-assist control apparatus (not shown) controlled by operation of steering wheel 22. The translation of the piston within the cylinder will be seen to pivot steering beam 40 about its pivot point 42, thereby turning both powered drive wheel 28 and idler wheel 26 through drag links 38 and 44, respectively. Because the hydraulic ram is connected to turn the steerable wheels through pivoting rocker beam 40 (and individual drag links) rather than being connected directly to either wheel, a simple reciprocating ram can be used to provide extremely sharp cramp angles.

The ends of rocker beam 40 are shown in dashed lines at opposite limits of travel in FIG. 2. A pair of adjustable stop means 60, 61 fixedly mounted on main frame 10 (see FIG. 4) determine the maximum limits of rotation of rocker beam 40 about its pivot 42. As shown in FIG. 2 the axis of vertical shaft 50, upon which idler wheel support member 46 is carried, is arranged to perpendicularly intersect axle 48 upon which idler wheel 26 is journalled, as is better shown in FIGS. 3 and 4. Thus idler wheel 26 is not castered, and the idler wheel steering axis of shaft 50 passes through the idler wheel center and the idler wheel floor contact point.

Figure 3:
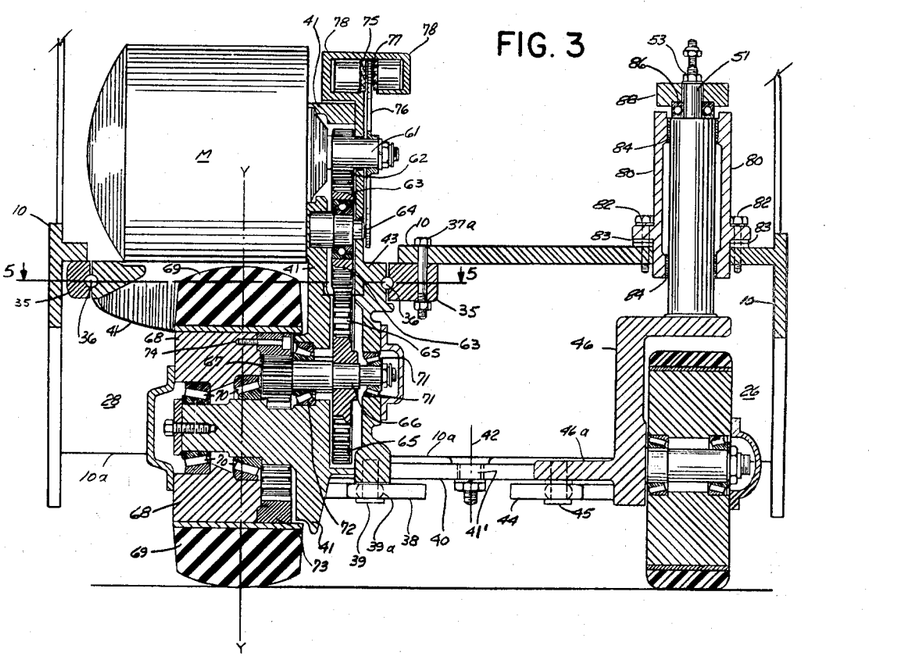
FIG. 3 is a cross-section view taken along line 3—3 of FIG. 2.
Figure 5:
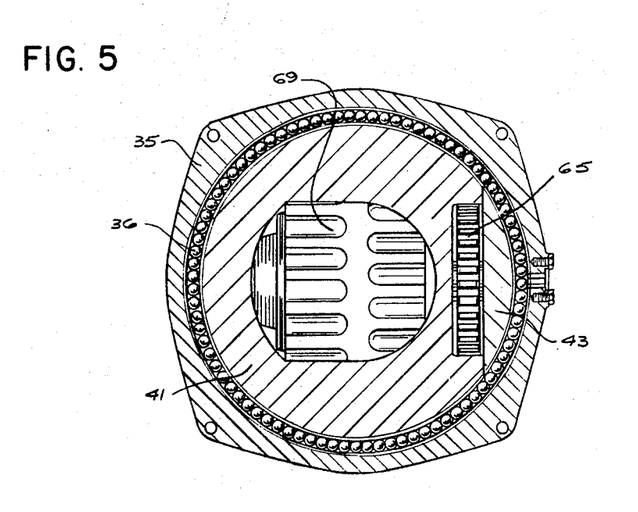
FIG. 5 is a view taken along line 5—5 of FIG. 3.

The mounting of drive assembly 31 to allow rotation about a vertical axis will be apparent from FIG. 3. A circular mounting ring 35 surrounding assembly 31 is bolted at several places to main frame 10, a single bolt 37a being shown in FIG. 3. Mounting ring 35 serves as the outer race of ball bearing assembly 36, in which the entire drive assembly is rotatable. The drive assembly includes drive unit main frame casting 41 and gear housing 43, which, as better shown in FIG. 5, are joined together to provide a circular periphery having a groove which serves as the inner race of the bearing member.

Motor M is fixedly mounted (as by means of bolts, not shown) to main drive unit casting 41. The output shaft 61 of motor M carries pinion 62. Pinion 62 meshes with pinion 63, which is journalled on a ball bearing on stub shaft 64, which is fixedly carried in main drive unit casting 41. Pinion 63 meshes with gear 65 mounted on shaft 66, which is journalled in main casting 41 by means of roller bearing 72 and in gear housing 43 by means of roller bearing 71. Pinion end 67 of shaft 66 meshes with an internall-toothed ring gear 73, which is bolted to felly 68 of drive wheel 28 by means such as bolt 74. Tire 69 is carried on felly 68. Further ball bearing means shown at 70 rotatably support wheel felly 68 on main drive unit casting 41. Thus it will be seen that motor M drives wheel 28 through a reduction gear train including gears 62, 63, 64, 65, 67, 73. Also mounted on shaft 61 of motor M is disc 76 of a disc brake assembly. The brake housing 78 portion of gear housing 43 carries pads 75 and 77 which controllably engage disc 76 to brake the drive unit.

Figure 4:
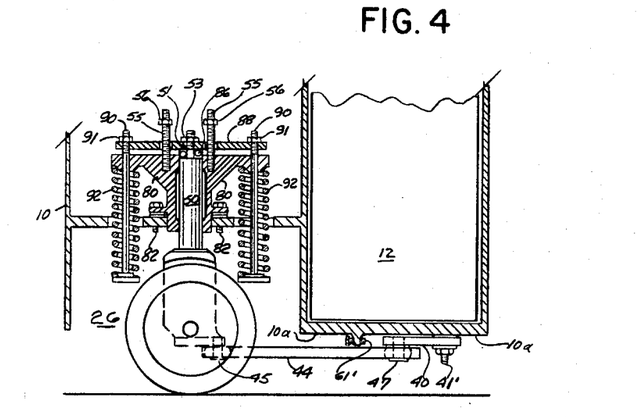
FIG. 4 is a cross-section view taken along line 4—4 of FIG. 2.

The central axis Y—Y of bearing unit 36 passes through the center of felly 68 and tire 69 as shown, and hence the entire drive unit may be rotatably positioned about the Y—Y axis to steer the truck. As shown in FIG. 3 one end of drag link 38 is pivotally attached to gear housing 43 of the drive wheel assembly by means of pin 39 through ball joint or self-aligning bearing 39a. The connection of the other end of drag link 38 by a similar ball-socket connection to steering rocker beam 40 is not shown in FIG. 3, being hidden behind wheel 28. Rocker beam 40 is pivotally mounted to the truck main frame 10, by means of stub shaft 41' which is integral with main frame 10, to pivot about axis 42. Drag link 44 is connected with a similar ball-socket joint 45 to a plate portion 46a of idler wheel support casting 46, and the other end of drag link 44, which is hidden behind idler wheel 26 in FIG. 3, is similarly connected to rocker beam 40 at point 47, as shown in FIG. 4. Ball-joint or self-aligning bearings are used to tie drag link 44 to rocker beam 40 and the idler wheel assembly so as to allow vertical travel of the idler wheel relative to main frame 10.

Unless a four-wheeled vehicle having a single driving wheel has its mating caster or idler wheel designed to yield, as by articulation or spring action, the vehicle tractive ability is seriously limited when the vehicle is used other than on very smooth floors. If the idler wheel is on a high spot on the floor it is necessary that the idler wheel yield vertically upwardly to insure adequate frictional contact between the drive wheel and the floor. Cylindrical stem or shaft 50 is rigidly attached to idler wheel mounting member 80, which is rigidly affixed to the truck main frame 10 by means shown as comprising bolts 82, 82. Mounting member 80 is provided with upper and lower guide bushings 84, 84 which allow vertical stem 50 both to rotate and to translate. The upper end 51 of stem 50 is provided with a first reduced diameter portion to accommodate thrust bearing 86 and a second portion of reduced diameter which is threaded to accommodate nut 53. The vertical force on stem 50 is applied through thrust bearing 86 to spreader bar 88, which communicates the vertical load from thrust bearing 86 to a pair of spring-biased rods 90, 90 (see FIG. 4) which are urged downwardly by compression springs 92, 92. With little or no vertical force on the idler wheel, springs 92 will urge spreader bar 88 downwardly so that the lower face of spreader bar 88 will lie against the upper face of mounting member 80, and in such a condition idler wheel 26 will be in its lowermost condition. Nut 53 holds spreader bar 88 on the upper end of shaft 50 to establish a definite vertical relationship between bar 88 and shaft 50, but shaft 50 is able to rotate about its axis. Rods 90, 90 pass slidingly through member 80 and spreader bar 88, and the upper ends of rods 90 are threaded to accommodate adjustment nuts 91, 91.

When greater vertical load is applied to idler wheel 26, the load is applied via stem 50, thrust bearing 86, spreader bar 88 and rods 90, 90 to compress springs 92, 92, with spreader bar 88 being lifted upwardly from member 80. The amount which the springs are compressed and the distance which the spreader bar is moved upwardly will be seen to be dependent upon the magnitude of the vertical force applied to idler wheel 26.

In order that the vehicle be readily adaptable to widely varying weight and load conditions, it is highly desirable that the idler wheel spring yielding force be readily adjustable. Such adjustment is also highly desirable in order to adjust drive wheel traction. In accordance with the invention, the yielding force may be readily adjusted in a simple and foolproof manner merely by loosening or tightening nuts 91, 91 on the upper threaded ends of spring rods 90, 90 thereby determining the vertical force necessary to raise spreader bar 88 upwardly from member 80.

It is highly desirable that the idler wheel assembly require a minimum overall height, and to this end, the compression spring means are mounted at substantially the same level as idler wheel stem 50 rather than above stem 50, and spreader bar 88 and rods 90 communicate the vertical force on stem 50 to springs 92. Thus the springs need not be mounted appreciably above wheel stem 50. It will be apparent that more than two springs may be used if desired.

For different material handling applications, it is highly desirable that the maximum amount of vertical yielding of the idler wheel be readily adjustable. For example, a truck planned for very high stacking in a warehouse having a relatively smooth floor should have little or no vertical movement, while a truck with a low lifting range intended to travel over rough dock-boards should have maximum vertical travel of the idler wheel. In order that a truck may be quickly adapted for either type of application, ready adjustment of maximum vertical travel of the idler wheel is required. In accordance with the invention, a pair of studs 55, 55 which are threaded into member 80 and pass through spreader bar 88 are provided with adjustment nuts 56, 56. It will be seen that the adjustment of nuts 56, 56 determines the maximum distance which spreader bar 18 may be raised upwardly from fixed member 80, and hence the maximum amount which idler wheel 26 may be raised.

As best seen in FIG. 3, idler wheel mounting member 80 is bolted to main frame 10 by bolts 82, through flange portions at the base of member 80. In order to adjust the basic height relationship between the entire idler wheel assembly and the truck main frame (and drive wheel), shims 83, 83 are provided between member 80 and main frame 10. It is frequently necessary or desirable to be able to adjust the nominal level of the idler wheel in order to keep the idler wheel contact even with the contact point of the drive wheel, which is much more subject to wear, and in addition, such adjustment of the idler wheel assembly may be used to transfer load from the idler wheel to the drive wheel, or from the drive wheel to the idler wheel. Prior art caster wheels having spring suspension were required to adjust the relative height between the two wheels by raising or lowering the entire drive wheel assembly with respect to the truck main frame. In accordance with the present invention all of the relative height adjustment is accomplished by adjustment of the height of the idler wheel assembly, with the advantage that the larger, heavier and more complicated drive wheel assembly may have a fixed vertical mounting with respect to the truck main frame. As will be seen in FIGS. 3 and 4, all of the steering linkage is located below the bottom edge 10a of the battery compartment of the truck.

Because idler wheel 26 is not castered, it may be mounted near the perimeter of the truck, and irrespective of truck direction of travel, the support point of idler wheel 26 will remain a fixed distance from the center of the truck, and a fixed distance from the support points of all of the other wheels, so that lateral and longitudinal stability of the truck both will remain constant.

Figure 7:
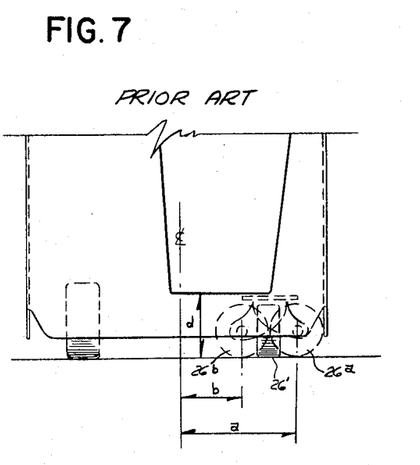
FIGS. 7 through 10 are diagrammatic views useful in understanding the advantages of various geometrical relationships of vehicles constructed in accordance with the present invention, FIGS. 9 and 10 being views looking upwardly from beneath the truck, and FIGS. 7 and 8 being side views.
Figure 8:
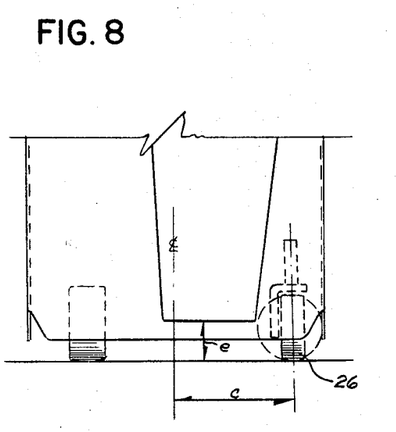

In FIG. 7 a prior art castered wheel 26' is shown in dashed lines swivelled to its outermost position at 26a, and also shown swivelled to its innermost position at 26b. It will be seen that the distance of the support point of such a castered wheel varies from the centerline of the truck from a maximum distance $a$ to a minimum distance $b$. Comparison with a truck of the same width shown in FIG. 8 which incorporates the present invention will readily indicate that by use of the non-castered idler wheel 26 the support point of wheel 26 remains a fixed distance $c$ from the truck centerline, thereby maintaining truck lateral stability constant. Also, because a non-castered wheel requires less space beneath the truck, it should also be noted that a significantly larger diameter wheel may be provided than that diameter which a castered wheel could have while requiring an equal amount of space. Non-castered idler wheel 26 in FIG. 8 will be seen to have a significantly larger diameter than the castered wheel 26' of the prior art shown in FIG. 7. If the idler wheel of the present invention is provided with exactly the same diameter as a prior art castered wheel, trucks built according to the present invention may have a constant lateral stability equal to the maximum lateral stability of the prior art trucks. However, even if a significantly larger idler wheel is employed in practicing the invention, the constant lateral stability of the truck may be made almost as much as the maximum lateral stability of the prior art truck, i.e., dimension $c$ in FIG. 8 is almost as much as dimension $a$ in FIG. 7, even though a larger diameter wheel is employed in FIG. 8. The use of a larger diameter wheel is advantageous in that a vehicle may be provided which can travel faster, with greater load capcity, with less likelihood of damage to floors.

Because idler wheel 26 requires less operating space, the operator's platform of a truck designed to accommodate a standing operator may be significantly lowered, as will become apparent from a comparison of of FIGS. 7 and 8. Dimension $e$ in FIG. 8 may be made considerably smaller than dimension $d$ in FIG. 7 due to the small space required for idler wheel 26 of FIG. 8 as compared to castered wheel 26' of FIG. 7.

Figure 6:
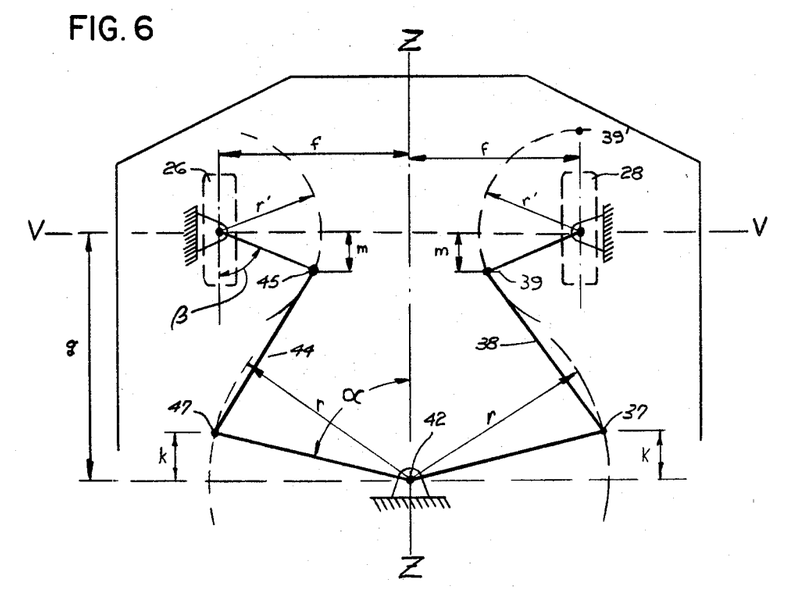
FIG. 6 is a geometric diagram useful in understanding the construction and operation of the steering system portion of the present invention.

A better understanding of the geometry of the steering system may be had by reference to the schematic diagram of FIG. 6. The longitudinal centerline of the steering system of the truck is shown by dashed line Z—Z. This centerline usually approximates, but need not exactly coincide with the actual centerline, i.e. the line midway between the outermost lateral extremities of the truck. The rear wheels of the truck, shown at 26 and 28 in FIG. 6, are mounted so that their support points are equidistant (dimension $f$) from steering centerline Z—Z. The pivot point 42 of rocker beam 40 is located on centerline Z—Z a distange $g$ forward of axis V—V. The pivot points 37 and 47 at which drag links 38 and 44 connect to rocker beam 40 are both located at a radius distance $r$ from the fixed pivot point 42 of the rocker beam, and hence pivot points 37 and 47 swing through the arcs shown in dashed lines in FIG. 6 as the vehicle is steered. With the steering mechanism in neutral or centered position, it will be seen that the rocker beam pivot point 42 is located a substantial distance (dimension $k$ in FIG. 9) forward of pivot points 37 and 47. The pivot points 39 and 45 at which drag links 38 and 44 connect to drive wheel 28 and idler wheel 26 are both located at a radial distance $r'$ from the vertical steering axes of these wheels, and hence pivot points 39 and 45 swing through the arcs shown in dashed lines in FIG. 9 as the vehicle is steered. With the steering mechanism in its centered position, it will be seen that pivot points 39 and 45 are both located a substantial distance (dimension $m$ in FIG. 9) forwardly of axis V—V defined by the steering axes of wheels 28 and 26.

In FIG. 6 drag links 38 and 44 are illustrated as simple straight links. As the rocker beam is caused to pivot about point 42, drag link 38 will maintain a fixed distance between pivot points 37 and 39, thereby turning powered wheel 28, and similarly, drag link 44 will maintain a fixed distance between pivot points 47 and 45, thereby turning idler wheel 26.

In order to obtain the extremely sharp turning angles deemed necessary for narrow-aisle operation, it is, of course, necessary that wheels 26 and 28 turn through considerable angles from the centered position shown in FIG. 6. If wheel 28 turns substantially clockwise from the position shown in FIG. 6, pivot point 39 must, of course, follow the arc at radius $r'$, to a point where pivot 39 is located substantially to the rear of axis V—V and perhaps directly to the rear of the wheel 28 steering axis, as indicated by point 39'. A straight drag link interconnecting pivot points 37 and 39 would not allow such rotation of wheel 28, and hence drag link 38 is curved (FIGS. 2 and 10) so as to clear wheel 28 throughout a large range of steering angles. It will be noted that because rocker beam 40 pivots about a point (42) located substantially forward of axis V—V, pivot point 37, to which one end of drag link 38 is connected travels both inwardly and rearwardly as wheel 28 is rotated clockwise, helping drag link 38 clear wheel 28. The drag link 44 connection to idler wheel 26 will be recognized to operate on similar principles. The operation of the steering system of the present invention will now be clear from inspection of FIGS. 9 and 10 wherein the wheels are shown turned to two opposite extreme conditions. It is generally regarded as necessary for efficient narrow-aisle operation that the truck turning radius be capable of being short enough to remain within the confines of the truck, and it will be evident from FIGS. 9 and 10 that that requirement is met by the present invention. In FIG. 9 the turning axis of the truck will be seen to be located at point $P_1$, and in FIG. 10 at point $P_2$.

In order to minimize tire scrubbing the axle directions of the two steerable wheels must intersect substantially at the vehicle turning axis, as shown in FIGS. 9 and 10, which in turn requires that the two steerable wheels be turned through different angles whenever the vehicle is turning. Thus in FIG. 9, wherein idler wheel 26 is the "outside" wheel, i.e., the wheel located farthest from point $P_1$, wheel 26 is turned through a lesser angle than the then "inside" wheel, wheel 28. Conversely, where wheel 26 is the "inside" wheel, as shown in FIG. 10, wheel 26 is turned through a greater angle than wheel 28. Even though the dimensions shown in FIG. 6 as $r$, $r'$, $k$ and $m$ are identical for both steerable wheels, and even though the geometry of both drag links is the same, the proper difference in the steering angles of the two wheels is provided by the four-bar linkage arrangement utilized to steer each wheel.

As in most practical steering systems, the geometry of the present steering arrangement does not wholly eliminate tire scrubbing, but the four-bar linkages shown actually provide very little tire scrubbing. It has been found that in most practical embodiments of the invention, distance $r$ (FIG. 6) is equal to or greater than distance $f$; that distanse $g$ is equal to or greater than $f$, that the effective crank arm length at each wheel is between $.25\,f$ and $.75\,f$, that angle $\alpha$, or ($90°$-arc sin $s/k$) should approximate 80 degrees, and must be less than 90 degrees, and that angle $\beta$, or ($90°$-arc sin $m/r'$) should approximate 75 degrees, and also must be less than 90 degrees.

In one successful embodiment of the invention utilized on a truck having a 50 inch wheelbase, dimension $f$ was 13.5 inches, dimension $r'$ was 5.75 inches, dimension $k$ was 2.25 inches, dimension $g$ was 15 inches, dimension $m$ was 1.49 inches, and dimension $r$ was 14.7 inches. Rotation of the rocker arm merely through 18 degrees from a centered position in either direction was effective to turn the inside wheel through 90 degrees and the outside wheel through 60 degrees.

While the specific embodiment disclosed in detail utilizes a symmetrical linkage system, in which both steerable wheel crank arm radii are the same, both arms of rocker beam 40 are identical, and both drag-links are identical, it will be readily apparent to those skilled in the art that such symmetry is not an essential attribute of the invention, though it is usually desirable. In view of this disclosure, various modifications in which the steering linkage is not symmetrical will become apparent. The modifications necessary after perusal of this disclosure, to allow the rocker beam pivot point to be shifted laterally nearer one steerable wheel than the other, for example, are well within the skill of the art.

Figure 11:
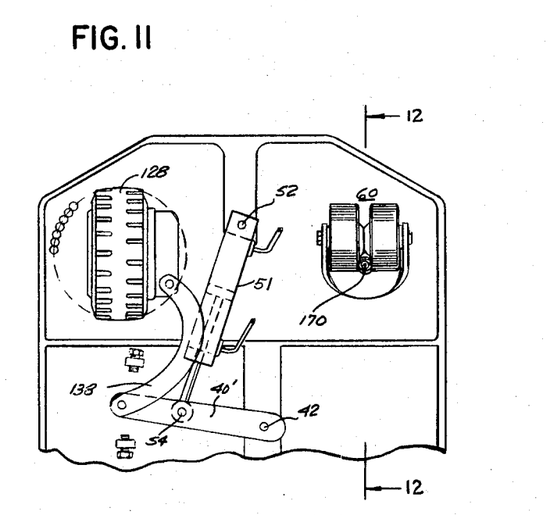
FIG. 11 is a view looking upwardly from beneath a modified form of truck.

While the preferred embodiment of the invention has been illustrated in connection with a vehicle having two steerable wheels, it will be apparent at this point to those skilled in the art that certain aspects of the invention are applicable as well to vehicles having a single wheel steered by power. For example, certain applications well might employ power steering solely on a castered wheel. Prior art power steering arrangements are largely disadvantageous for either of the two mentioned applications in that a simple hydraulic cylinder cannot provide the considerable angular range of wheel rotation needed for narrow-aisle operation. FIGURE 11 shows a modified form of the invention in which power-assist steering is applied to only one wheel of a vehicle. Parts in FIG. 11 corresponding in principle to those of FIGS. 1–10 are numbered similarly. In FIG. 11 it will be seen that the hydraulic piston-cylinder assembly 51 acts between pivot points 52 and 54, just as in FIG. 2, but that rocker beam 40' comprises only half of rocker beam 40 of FIG. 2, and that only one steerable wheel (128) is connected to be steered by power-assist steering cylinder 51, drag link 138 connecting pivoting link 40' to powered wheel 128. Rather than comprising an idler wheel steered by power-assist assembly 51, the system of FIG. 11 includes a castered wheel assembly of the prior art type shown at 60 in FIG. 2 of Gibson Patent No. 2,564,002 mentioned above. The castered wheel assembly is pivoted about swivel axis 170.

Figure 12:
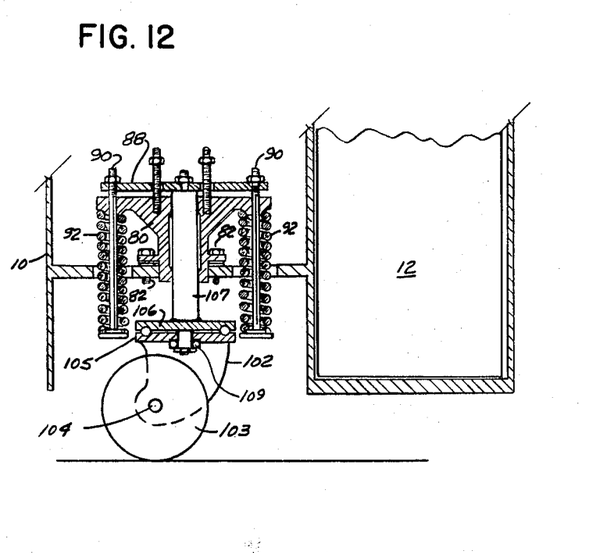
FIG. 12 is a side view, with certain parts shown in cross-section, of a modified form of idler wheel mounting means.

While the preferred embodiment of the suspension system of the present invention has been described in the principal embodiment as including a non-castered idler wheel, some of the features of the invention may be applied as well to trucks having a swivel caster. In certain vehicles, such as that shown in Patent No. 2,925,887 granted Feb. 23, 1960, to C. D. Gibson, the use of swivel casters is highly advantageous. In such a vehicle, the swivel caster mounting may simply and advantageously utilize the spring suspension arrangement of the present invention. Such an arrangement is illustrated in FIG. 12 wherein caster yoke member 102 carries caster wheel 103 journalled on axle 104. Upper plate portion 105 of yoke member 102 and base plate portion 106 of shaft member 107 form opposite races of a bearing, thereby allowing yoke 102 and wheel 103 to swivel about the axis of reciprocating but non-rotating shaft 107. The vertical force on the caster wheel is applied via reciprocable shaft 107, which corresponds in principle to shaft 50 in FIG. 4, except that shaft 107 is merely translatable, and not rotatable, in the device of FIG. 12. Shaft 107 is preferably pinned or keyed to spreader bar 88 to prevent relative rotation between these parts. Bearing 109 on the lower end of shaft 107 facilitates rotation of yoke 102 and wheel 103 about the axis of shaft 107. The remainder of the suspension system of FIG. 12 corresponds to similarly numbered parts of the system of FIG. 4 and need not be further described in detail.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

Having described our invention, what we claim as new and desired to secure by Letters Patent is:

1. A power-driven material handling truck, comprising, in combination: a base frame; a first pair of non-steerable wheels supporting one end of said base frame; a second pair of steerable wheels supporting the other end of said base frame comprising a powered drive wheel and an idler wheel; and steering linkage means interconnecting said wheels of said second pair, each of said wheels of said second pair being rotatable about a respective substantially vertical steering axis, and each of said wheels of said second pair being adapted to contact a floor surface at respective contact points, said vertical steering axes of said steerable wheels being arranged substantially to intersect said respective contact points, said steering linkage means comprising a rigid lever means pivotally mounted substantially midway in a lateral direction between said steerable wheels, and a pair of drag links connecting opposite ends of said lever means to respective ones of said steerable wheels, the distance between said opposite ends of said lever means being equal to or greater than the distance between said steering axes of said wheels of said second pair.

2. Apparatus according to claim 1 including means for pivoting said lever means comprising piston-cylinder actuating means pivotally connected to said base frame and said lever means to steer said truck.

3. A power-driven material handling truck, comprising, in combination: a base frame; a first pair of wheels supporting one end of said truck; a second pair of steerable wheels supporting the other end of said truck, each of said wheels of said second pair being rotatable about a respective steering axis, a first line between the steering axes of said steerable wheels comprising a first reference axis and a second line between said wheels of said first pair defining a second reference axis, said first and second axes being substantially parallel to each other; a rigid lever member pivotally attached to said base frame at a first point to pivot about a third substantially vertical axis, said first point being located longitudinally in between said first and second reference axes and laterally substantially midway between said steering axes of said second pair of wheels, and a pair of links connected between said steerable wheels of said second pair and respective opposite ends of said lever member at distances from said first point which are greater than half the distance between said steering axes.

4. A power-driven material handling truck, comprising, in combination: a base frame; a first pair of wheels supporting one end of said base frame and a second pair of wheels supporting the other end of said base frame each of said wheels of said second pair being mounted to rotate about a respective substantially vertical steering axis; a rigid lever member pivotally attached to said base frame at a first point to pivot about a further substantially vertical axis said first point being located displaced from a line interconnecting said steering axes of said wheels of said second pair at a distance greater than half the distance between said steering axes of said second pair; steering control means connected between said base frame and said lever member to pivot said lever member about said further axis; and a rigid link pivotally connected between said lever member and at least one of said wheels of said second pair.

5. A truck according to claim 4 having a second link pivotally connected between said lever member and the other of said wheels of said second pair.

6. A truck according to claim 4 in which a line midway between said wheels of said first pair defines an approximate truck centerline.

7. A truck according to claim 4 in which a line extending between said steering axes of said second pair of wheels defines a second axis and in which a line extending between said wheels of said first pair defines a third axis, said further axis being located in between said second and third axes.

8. A truck according to claim 4 in which said rigid link is connected between one end of said lever member and said one wheel of said second pair, and in which a second rigid link is connected between the opposite end of said lever member and the other wheel of said second pair both of said rigid links being connected at substantially the same elevation to said lever member and to said wheels of said second pair.

9. Apparatus according to claim 4 in which one of said wheels of said second pair comprises a powered drive wheel attached to said base frame by means of a first member rotatably journalled in said base frame; motive means fixedly attached to said first member; shaft means journalled in said first member to rotate about another axis, said drive wheel being mounted on said shaft means; and reduction gearing connected between said motive means and said shaft means.

10. A material handling vehicle, comprising, in combination: a frame; a first pair of non-steerable wheels supporting one end of said frame, the axle direction of each of said wheels of said first pair being parallel to a first axis, a first plane perpendicular to said first axis defining a vehicle longitudinal plane; third and fourth wheels supporting the other end of said frame; first and second wheel-mounting members for carrying said third and fourth wheels, respectively, each of said wheel-mounting members being rotatably mounted to said frame to rotate about a respective steering axis, a second plane containing said steering axes being perpendicular to said longitudinal plane and each of said steering axes being located equal distances $f$ from said longitudinal plane on opposite sides of said longitudinal plane; each of said wheel-mounting members having a pivoted connection means situated a first distance $r'$ from its steering axis; a rigid lever member pivotally attached to said frame to pivot about a further axis located substantially within said longitudinal plane at a distance $g$ from said second plane, said lever member having first and second arms extending on opposite sides of said longitudinal plane, said arms having pivotal connection means situated at substantially equal distances $r$ from said further axis; steering control means connected to pivot said lever member with respect to said frame about said further axis; a first drag link connected between the pivotal connection means of said first arm and the pivotal connection means of one of said wheel-mounting members; and a second drag link connected between the pivotal connection means of said second arm and the pivotal connection means of the other wheel-mounting member, each distance $r$ being equal to or greater than each distance $f$.

11. A vehicle according to claim 10 having a motor carried on said first wheel-mounting member and reduction gearing interconnecting said motor and said third wheel, said fourth wheel comprising an idler wheel, the steering axis of said fourth wheel passing through the point at which said fourth wheel contacts the floor surface.

12. A vehicle according to claim 10 in which the point at which said lever member is pivotally attached to said frame is situated longitudinally in between said first pair of wheels and said second plane.

13. Apparatus according to claim 10 in which a third plane defined by the axes of the pivotal connections to said first and second arms is arranged, when said third and fourth wheels are both steered to travel in the same direction as said first pair of wheels, to be parallel to said first axis, parallel to said second plane, and longitudinally offset toward said second plane from the pivotal connection of said lever member to said frame.

14. Apparatus according to claim 10 in which the distance between a given one of said steering axes and said longitudinal plane is less than the distance between the pivotal connection of said leved member to said frame and the pivotal connection means on a given one of said arms of said lever member.

15. Apparatus according to claim 10 in which the longitudinal distance between said pivotal connection of said lever member to said frame and said second plane is greater than the distance of a given one of said steering axes from said longitudinal plane.

16. Apparatus according to claim 10 in which distance $g$ is equal to or greater than distance $f$, and in which, when said third and fourth wheels are pointed parallel to said longitudinal plane, said pivotal connection means on said first and second arms are each located longitudinally in the direction toward said second plane from said further axis.

17. Apparatus according to claim 10 in which each distance $r'$ is betwen .25 and .75 of distance $f$.

18. A power-driven material handling truck, comprising, in combination: a base frame; a pair of non-steerable wheels for supporting one end of said base frame; a pair of steerable wheels for supporting the other end of said base frame, one of said steerable wheels comprising a powered drive wheel and the other one of said steerable wheels comprising a non-castered idler wheel spring-mounted on said base frame; a truck power compartment mounted on said base frame longitudinally between said non-steerable wheels and said steerable wheels and extending vertically downward to a level below the tops of said steerable wheels; and steering linkage means connected to steer said steerable wheels, said steering linkage means being connected to said base frame and located at a level below said power compartment and movable there beneath as said steerable wheels are steered.

19. A truck according to claim 18 having an operator's platform mounted on said base frame, said operator's platform being located between said steerable wheels and at a level below the top of said idler wheel, and in which said steering linkage means is connected to said base frame and to said steerable wheels at levels below the level of said operator's platform.

20. Apparatus according to claim 18 in which said truck power-compartment is adapted to carry electric storage batteries.

21. Apparatus according to claim 18 in which said truck power-compartment comprises an internal combustion engine.

22. A power-driven material-handling truck, comprising, in combination: a base frame; a first pair of non-steerable wheel means comprising first and second wheels supporting one end of said base frame; a second pair of steerable wheel means comprising third and fourth wheels supporting the other end of said base frame including a powered drive wheel and a non-powered non-castered idler wheel, said powered drive wheel being connected in a rigid vertical relationship to said base frame and said idler wheel being connected in a yielding vertical relationship to said main frame; and steering linkage means interconnecting said wheels of said second pair, said steering linkage means comprising lever means pivotally attached to a first point to said base frame, a line passing through said first point and midway between said wheels of said second pair defining a truck longitudinal axis, a first link lying on one side of said axis pivotally attached to and connected between a second point on said lever means and said drive wheel of said second pair, and a second link lying on the other side of said axis pivotally attached to and connected between a third point on said lever means and said idler wheel of said second pair, said second and third points being situated on opposite sides of said first point; and expansible-chamber motive means secured to said lever means and to said base frame for pivoting said lever means about said first point to steer said truck.

23. A power-driven material-handling truck, comprising, in combination: a base frame; a first pair of wheels supporting one end of said base frame; a second pair of wheels supporting the other end of said frame; a first of said wheels of said second pair comprising a powered drive wheel assembly and the second of said wheels of said second pair comprising a steerable non-castered idler wheel; first mounting means for attaching said drive wheel to said base frame to allow rotation of said drive wheel assembly about a steering axis and to constrain said drive wheel assembly against translation with respect to said base frame; and second mounting means for attaching said steerable idler wheel to said base frame to allow rotation and translation of said idler wheel with respect to said base frame, said second mounting means comprising a first member having axle means adapted to carry said idler wheel and a vertically extending shaft, bearing means attached to said base frame and adapted to receive said shaft; a spreader bar attached to said shaft, a plurality of compression spring means arranged to act between said spreader bar and said bearing means to yieldingly resist vertical translation of said shaft, and adjustable stop means for limiting translation of said shaft and said spreader bar with respect to said bearing means.

References Cited

UNITED STATES PATENTS

| | | | |
|---|---|---|---|
| 2,164,470 | 7/1939 | Opolo | 280—95 |
| 1,164,310 | 12/1915 | Nilson. | |
| 1,178,692 | 4/1916 | Trucano | 280—96.2 |
| 1,991,577 | 2/1935 | Remde. | |
| 2,429,302 | 10/1947 | Abbe | 280—95 |
| 2,564,002 | 8/1951 | Gibson | 180—52 |
| 2,625,285 | 1/1953 | Weaver | 180—54 |
| 2,713,918 | 7/1955 | Framhein | 180—52 |
| 2,753,946 | 7/1956 | Quayle | 180—52 X |
| 2,929,460 | 3/1960 | Ulinski | 180—52 X |
| 3,080,175 | 3/1963 | De Marco | 280—95 |
| 3,130,981 | 4/1964 | Christenson et al. | 180—52 X |

A. HARRY LEVY, *Primary Examiner.*